(12) United States Patent
Alano

(10) Patent No.: US 10,533,478 B2
(45) Date of Patent: Jan. 14, 2020

(54) MIXER AND VALVE ASSEMBLY

(71) Applicant: Faurecia Emissions Control Technologies, USA, LLC, Columbus, IN (US)

(72) Inventor: Eduardo Alano, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 37 days.

(21) Appl. No.: 15/838,453

(22) Filed: Dec. 12, 2017

(65) Prior Publication Data

US 2019/0178140 A1  Jun. 13, 2019

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2260/06* (2013.01)

(58) Field of Classification Search
CPC combination set(s) only.
See application file for complete search history.

(56) References Cited

U.S. PATENT DOCUMENTS

| | | | |
|---|---|---|---|
| 4,420,933 A | 12/1983 | Kajitani et al. | |
| 6,623,155 B1* | 9/2003 | Baron | B01F 5/0611 366/181.5 |
| 8,661,792 B2 | 3/2014 | Greber et al. | |
| 9,248,404 B2* | 2/2016 | Brunel | B01F 3/04049 |
| 9,464,546 B2 | 10/2016 | Perrot et al. | |
| 9,719,397 B2* | 8/2017 | Alano | F01N 3/2892 |
| 9,810,126 B2* | 11/2017 | Lebas | B01F 3/04049 |
| 2007/0036694 A1* | 2/2007 | Nishioka | B01D 53/90 422/168 |
| 2009/0266064 A1* | 10/2009 | Zheng | B01F 3/04049 60/317 |
| 2017/0107877 A1 | 4/2017 | Johnson et al. | |

FOREIGN PATENT DOCUMENTS

| | | |
|---|---|---|
| CN | 205164443 | 4/2016 |
| CN | 106014560 | 10/2016 |
| CN | 205627632 | 10/2016 |
| DE | 102011075594 | 11/2012 |
| DE | 102012209689 | 12/2013 |
| GB | 174131 | 1/1922 |
| GB | 1215148 | 12/1970 |
| JP | 2016188579 | 11/2016 |
| WO | 2004113690 | 12/2004 |
| WO | 2011110885 | 9/2011 |
| WO | 2013004517 | 1/2013 |
| WO | 2015018849 | 2/2015 |
| WO | 2016158993 | 10/2016 |

* cited by examiner

*Primary Examiner* — Binh Q Tran
(74) *Attorney, Agent, or Firm* — Carlson, Gaskey & Olds, P.C.

(57) ABSTRACT

A mixer assembly for a vehicle exhaust system includes a mixer housing defining an internal cavity that is configured to receive engine exhaust gases and an upstream baffle that is positioned at an inlet end of the mixer housing. The upstream baffle comprises a plate having an open area that comprises a fixed geometric configuration through which exhaust gas enters the internal cavity. A valve is movable from a closed position toward an open position to provide a variable geometric configuration that changes the open area to reduce back pressure.

20 Claims, 4 Drawing Sheets

MIXER AND VALVE ASSEMBLY

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations to provide a more effective transformation into ammonia. However, the spray generated by small droplet dosers is very sensitive to recirculation flow, which can lead to increased deposit formation.

Further, as known, back pressure within the mixer increases as the volumetric exhaust flow through the mixer increases. Increased back pressure provides the benefit of reduced deposit formation. The risk for deposit formation is higher at engine operating points that have low volumetric flow and thus lower back pressure generated by the mixing system. The deposits can build up over time and can adversely affect system operation.

SUMMARY OF THE INVENTION

In one exemplary embodiment, a mixer assembly for a vehicle exhaust system includes a mixer housing defining an internal cavity that is configured to receive engine exhaust gases and an upstream baffle that is positioned at an inlet end of the mixer housing. The upstream baffle comprises a plate having an open area that comprises a fixed geometric configuration through which exhaust gas enters the internal cavity. A valve is movable from a closed position toward an open position to provide a variable geometric configuration that changes the open area to reduce back pressure.

In another exemplary embodiment, a vehicle exhaust system includes a first exhaust component configured to receive engine exhaust gases, a second exhaust component downstream of the first exhaust component, and a mixer positioned between the first and second exhaust components. The mixer includes an outer housing that defines an internal cavity to receive the engine exhaust gases from the first component. The outer housing includes at least one injection opening. The mixer also includes an upstream baffle positioned at an inlet end of the mixer housing, with the upstream baffle comprising a plate having an open area that comprises a fixed geometric configuration through which exhaust gas enters the internal cavity. A valve is movable from a closed position toward an open position to provide a variable geometric configuration that changes the open area to reduce back pressure. The valve moves toward the open position in response to an exhaust gas flow rate exceeding a predetermined limit. A doser is configured to introduce fluid through the injection opening and into the internal cavity to mix with the engine exhaust gases to provide a mixture that is directed to the second exhaust component.

In another exemplary embodiment, a method for reducing back pressure in a mixer for an exhaust system comprises the steps of: providing a mixer housing defining an internal cavity that receives engine exhaust gases; positioning an upstream baffle at an inlet end of the mixer housing, the upstream baffle comprising a plate having an open area that comprises a fixed geometric configuration through which exhaust gas enters the internal cavity; and moving a valve from a closed position toward an open position when an exhaust gas flow rate exceeds a predetermined limit to provide a variable geometric configuration that changes the open area to reduce back pressure.

In a further embodiment of any of the above, the upstream baffle includes an aperture that receives the valve, and wherein when the valve is in the closed position the mixer assembly is operating in the fixed geometric configuration, and wherein when the valve moves toward the open position the mixer assembly is operating in the variable geometric configuration.

In a further embodiment of any of the above, the valve comprises a flap that is mounted to the upstream baffle in an overlapping relationship with the aperture, and including a resilient member to bias the flap to the closed position.

These and other features of this application will be best understood from the following specification and drawings, the following of which is a brief description.

DETAILED DESCRIPTION

Figure 1:
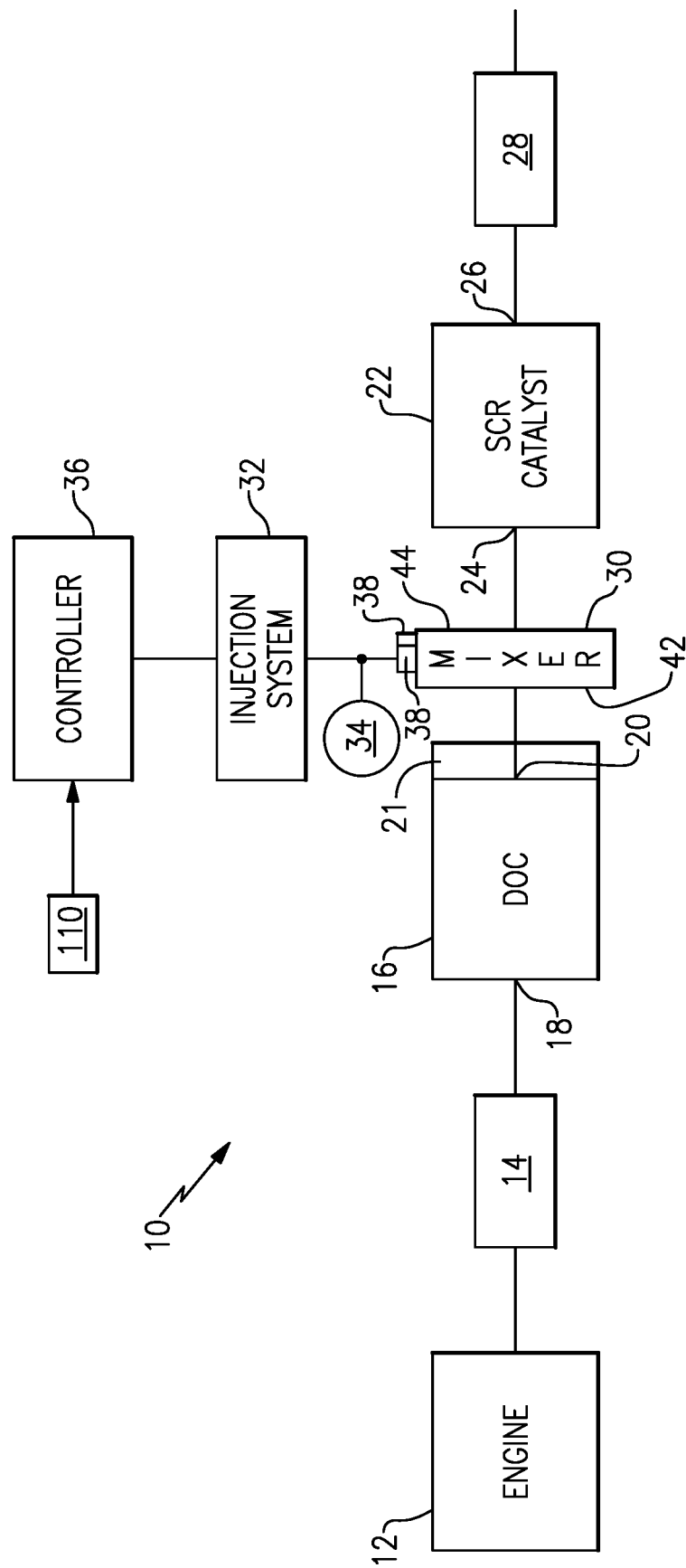
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, tubes, connectors, filters, valves, catalysts, mufflers, resonators, etc. In one example configuration, the upstream exhaust components 14 direct engine exhaust gases into a diesel oxidation catalyst (DOC) 16 having an inlet 18 and an outlet 20.

Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, tubes, connectors, filters, valves, catalysts, mufflers, resonators, etc. These upstream 14, downstream 28, and other various components 16, 21, 30, 22 can be mounted in various different configurations and combinations dependent upon vehicle application and available packaging space.

In one example configuration, a mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a diesel exhaust fluid and/or reducing agent, such as a solution of urea and water for example, into the exhaust gas stream upstream from the SCR catalyst 22 such that the mixer 30 can mix the fluid and exhaust gas thoroughly together. The injection system 32 injects the fluid into the exhaust gas flow such that the urea droplets go through vaporization and hydrolysis reactions to form ammonia gas. The mixer 30 thoroughly mixes the ammonia gas with the exhaust gas flow prior to directing the mixture to the SCR catalyst 22. The ammonia adsorbs on the catalyst and reacts with NOx as known.

The injection system 32 includes a fluid supply 34, a controller 36 that controls injection of the fluid, and a primary supplier or injector 38. In one example, the primary injector 38 comprises a doser that injects the fluid into the mixer 30. The mixer 30 comprises a mixer body having an inlet end 42 configured to receive the engine exhaust gases and an outlet end 44 to direct a mixture of swirling engine exhaust gas and products transformed from urea to the SCR catalyst 22. Examples of a mixer 30 that can be used in the exhaust system 10 can be found in U.S. Pat. No. 8,661,792 and co-pending U.S. application Ser. Nos. 12/57,693, 12/57,886, and 12/57,768 which are also assigned to the assignee of the present application and are hereby incorporated by reference.

Figure 2:
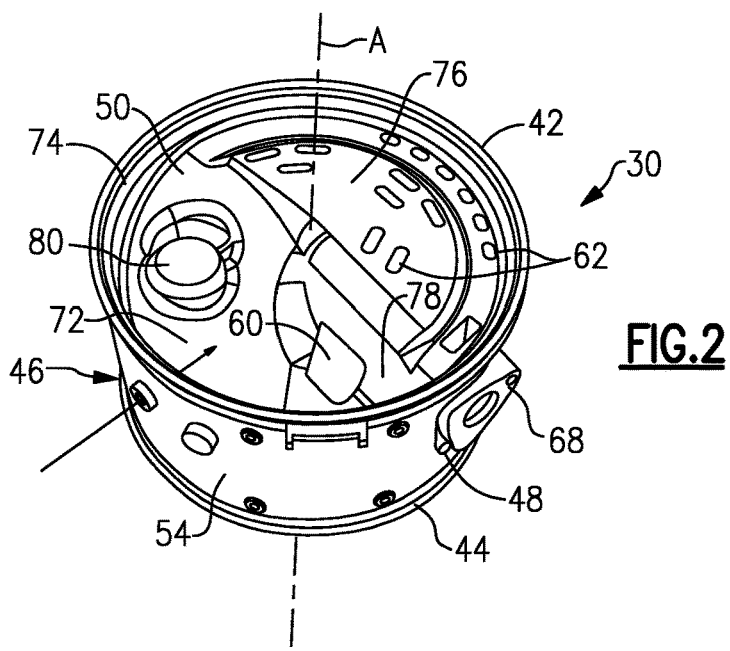
FIG. 2 is a perspective view of a mixer assembly with an upstream baffle having an opening for a valve.
Figure 3:
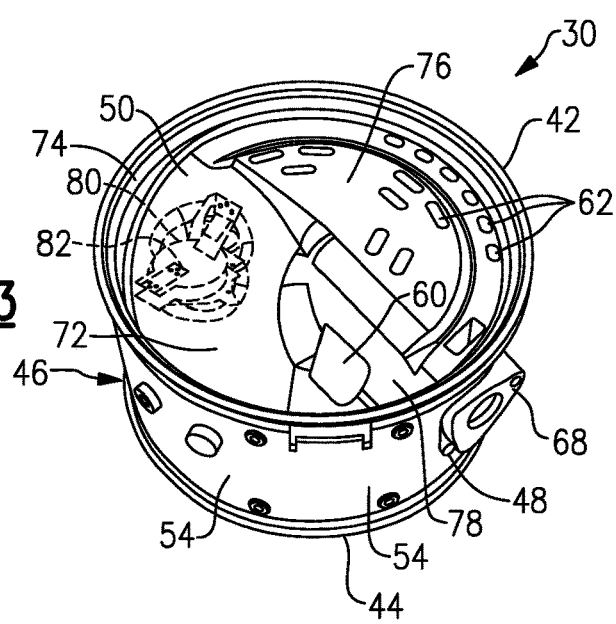
FIG. 3 is view similar to FIG. 2 but showing the valve installed in the opening.

As shown in one example configuration, the mixer 30 (FIG. 2) comprises a mixer outer housing 46 defining an internal cavity where the inlet end 42 is configured to receive the engine exhaust gases and the outlet end 44 is configured to direct a mixture of swirling engine exhaust gas and products transformed from urea to the SCR catalyst 22 or other downstream exhaust components. Further, the mixer 30 includes an upstream baffle 50 (FIGS. 2-3) and a downstream baffle 52 (FIG. 4) that are surrounded by the outer housing 46. The upstream baffle 50 is configured to initiate swirling of the exhaust gas flow. The outer housing 46 includes an outer peripheral surface 54 and an inner peripheral surface 56 (FIG. 4) that faces inwardly toward a mixer center axis A. The outer peripheral surface 54 of the outer housing 46 includes an opening 48 formed at a location between the upstream 50 and downstream 52 baffles. The opening 48 is configured to receive the primary fluid supplier/injector 38. In one example, a manifold 68 is used to facilitate mounting the injector 38 to the housing 46. Examples of various manifolds can be found in the assignee's other applications as referenced above.

The upstream baffle 50 at the inlet end 42 may include one or more large inlet opening(s) 60 that can receive the majority of the exhaust gas (for example, the large inlet opening 60 receives 60% of the exhaust mass flow rate), and which is configured to initiate the swirling motion. The upstream baffle 50 may also include one or more perforations, slots, or additional openings 62 that ensure optimal homogenization of exhaust gases and reduces back pressure. The upstream baffle 50 and the plurality of openings 60, 62 cooperate to initiate a swirling motion to the exhaust gas as the exhaust gas enters the inlet end 42 of the mixer 30. It should be understood that the disclosed upstream baffle 50 is just one example of an upstream baffle and that the baffle can comprise different shaped configurations and/or different numbers and patterns of openings.

Figure 4:
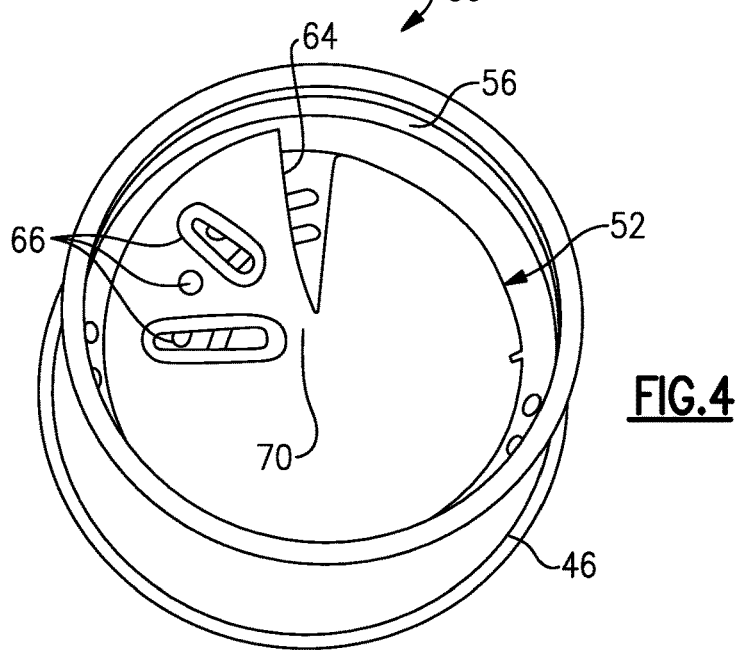
FIG. 4 is a perspective view of the mixer assembly of FIG. 2 as viewed from an outlet end.

As shown in FIG. 4, the downstream baffle 52 may include a large outlet opening 64 through which the majority of the exhaust gas exits. The downstream baffle 52 may also include one or more additional outlet openings 66 through which the exhaust gas exits. In one example, the downstream baffle 52 comprises a helical portion 70 and the large outlet opening 64 comprises a primary outlet opening and is larger than the other outlet openings 66. The helical portion 70 may include the additional outlet openings 66. It should be understood that the disclosed downstream baffle 52 is just one example of a downstream baffle and that the baffle can comprise different shaped configurations and/or different numbers and patterns of openings.

In one example (FIGS. 2-3), the upstream baffle 50 comprises a helical portion 72 with a rim 74 formed about an outer perimeter of the baffle 50 that is attached to the housing 46. The large inlet opening 60 comprises a primary inlet opening and may be larger than the other openings 62. In the example shown, the upstream baffle 50 includes a domed portion with a flat peripheral portion 76 that includes the additional smaller openings 62. The helical portion 72 curves in a downstream direction about the axis A from one edge of the portion 76 toward the primary inlet opening 60. A wall portion 78 extends in the downstream direction from the opposite edge of the portion 76 toward the primary inlet opening 60. In one example, the portion 76 comprises approximately half of the inlet baffle 50 and the helical portion 72 comprises the other half; however, other percentages could also be used. Further, the upstream baffle may optionally comprise a flat plate without a helical portion.

In the example shown, the helical portion 72 is free from the additional openings 62 and includes one single opening or aperture 80. A valve 82 is installed within this aperture 80 and is moveable between a fully closed position (FIG. 5B) and an open position (FIG. 5C). When the valve 82 is in the fully closed position, the upstream baffle 50 comprises a plate structure having an open area that comprises a fixed geometric configuration through which exhaust gas enters the internal cavity provided within the housing 46 between the upstream 50 and downstream 52 baffles. Under certain conditions, the valve 82 moves from the closed position toward an open position to provide a variable geometric configuration that changes the open area to reduce back pressure.

In one example, the valve 82 moves toward the open position in response to the exhaust gas flow rate exceeding a predetermined limit. The valve is open when the pressure effectuated by the exhaust on the flap surface will correspond to a force that exceeds the spring resistance. The spring resistance can be adjusted as needed. In another example, the valve can be actively controlled by a controller and an electric or pneumatic actuator.

The open area for the fixed geometric configuration comprises the primary opening 60 through which exhaust gas enters the internal cavity and any secondary openings 62 that are smaller than the primary opening 60. When the valve 82 is in the closed position the mixer 30 is operating in the fixed geometric configuration as the size of the openings 60, 62 remains fixed and the open area in the upstream baffle 50 remains unchanged. When the valve 82 moves toward the open position in response to increased exhaust gas flow rate, the mixer 30 is operating in the variable geometric configuration as the aperture 80 becomes uncovered. The open area varies while the valve 82 moves toward a fully open position because more area of the aperture 80 is uncovered during the opening movement. Thus, as the valve 82 moves toward the open position, the open area is increased via exposure of the aperture 80 to reduce back pressure.

Figure 5A:
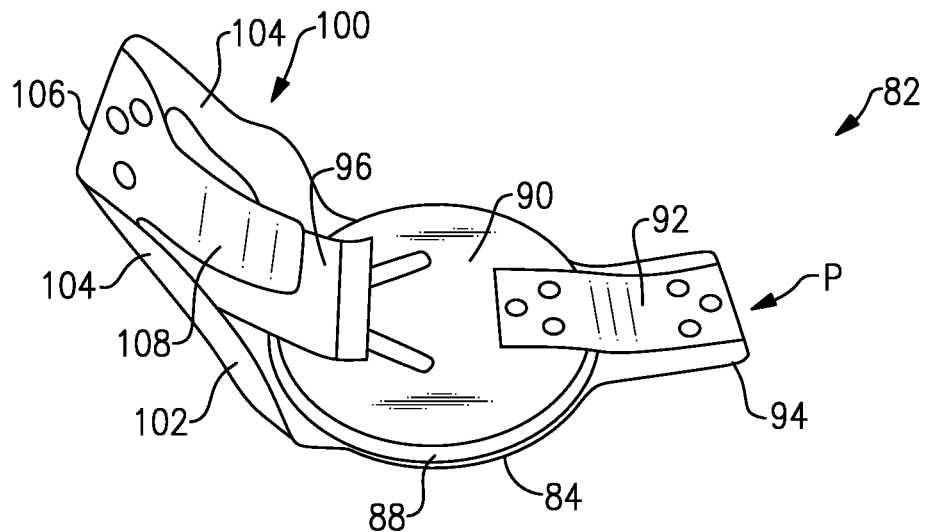
FIG. 5A shows perspective view of the valve of FIG. 3.
Figure 5B:
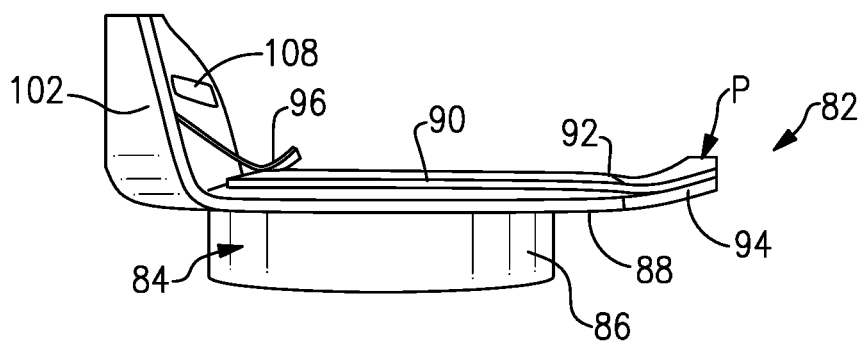
FIG. 5B is a side view of the valve of FIG. 5A in a closed position.
Figure 5C:
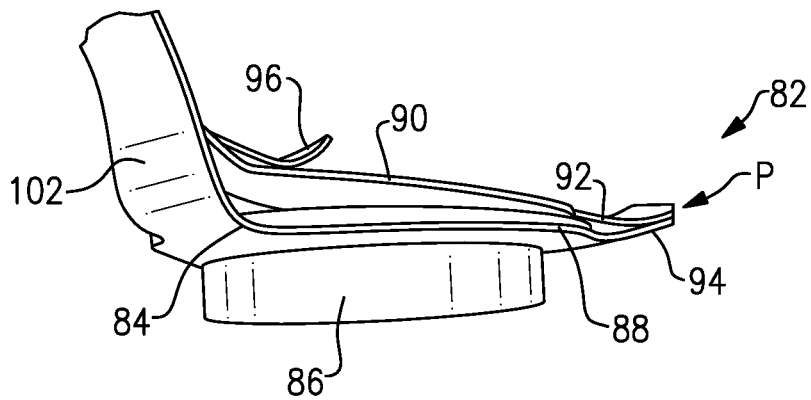
FIG. 5C is a side view of the valve of FIG. 5A in a partially open position.

The valve 82 is shown in greater detail in FIGS. 5A-5C. In one example, the valve 82 includes a frame 84 that fits within the aperture 80. The frame 82 has a short tubular portion 86 that extends in an upstream direction to fit through the aperture 80 and to seat the valve 82 within the upstream baffle 50. A flange 88 extends about a periphery of the tubular portion 86 in a radially outward direction and faces an inner surface of the baffle 50. The valve 82 includes a flap 90 that is mounted on a downstream side of the upstream baffle 50 in an overlapping relationship with the aperture 80. An upstream side of the flap 90 is seated against the flange 88 of the frame 84 to define the fully closed position. The flap 90 thus opens into the internal cavity of the mixer in response to increased exhaust gas flow pressure.

In one example, a tab 92 attaches the flap 90 to the frame 84. The frame 84 includes an extension 94 that extends radially outwardly from the flange 88. One end of the tab 92 is attached to the extension 94 and an opposite end of the tab 92 is attached to the flap 90. The tab 92 can be welded, brazed, fastened, etc. to the frame 84 and/or flap 90. The tab 92 is attached to an outer edge of the flap 90 such that the flap 90 can pivot relative to the frame 84 via the attachment to the extension 94 to define a pivot P. Thus, the tab 92 is a flexible member that can move the flap 90 between the open and closed positions.

In one example, a resilient member biases the flap 90 to the closed position. In one example, the resilient member comprises a spring 96 that is associated with a pivoting edge of the flap 90.

The valve 82 may also include a stop 108 to limit opening movement of the flap 90 and define a maximum open position. The frame 84 can include another radial extension portion 102 that extends outwardly from the flange 88. In one example, the radial extension portion 102 also extends in a downstream direction away from the baffle 50 and includes a pair of arms 104 connected to each other by a connecting portion 106 such that an open area is formed between the arms 104, flange 88, and connecting portion 106. A stop tab 108 has one end fixed to the connecting portion 106 and an opposite end is associated with the resilient member 96 that interacts with the flap 90. As the flap 90 moves toward the open position, the resilient member 96 and stop tab 108 cooperate with each other to define the maximum open position.

As such, the flange 88 of the frame 84 provides a seat to limit closing movement of the flap 90 and to define the fully closed position, while the stop tab 108, resilient member 96, and/or tab 92 cooperate to define the maximum open position. The flap 90 is positionable between the fully closed position and the maximum open position in an infinite number of positions in response to changes in exhaust gas flow rates to provide the variable geometric configuration. FIG. 5B shows the flap 90 in the fully closed position and FIG. 5C shows the flap 90 at a partially open position. As exhaust gas flow rate increases the flap 90 moves toward the maximum open position, and when the flow rate falls below the predetermined limit, the flap 90 will return to the fully closed position. Thus, the valve 82 is a passive valve that is solely moveable to the open position in response to an exhaust gas flow rate exceeding the predetermined limit.

Figure 6:
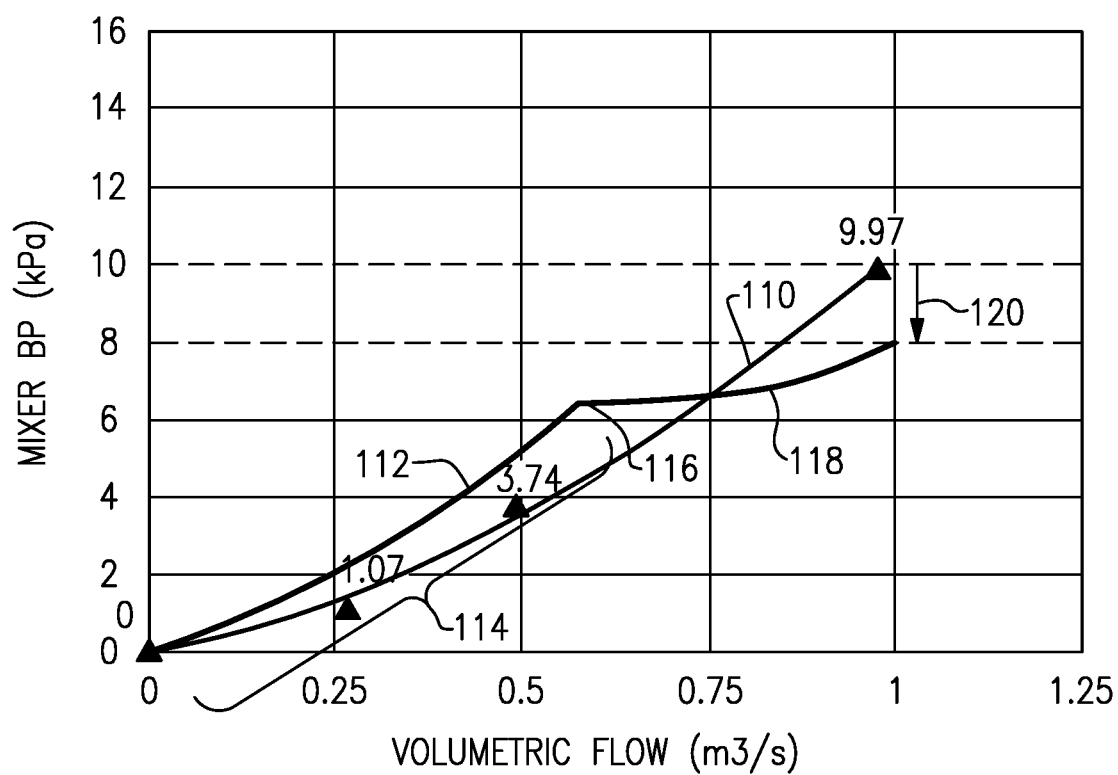
FIG. 6 shows a graph of back pressure v. flow rate for a mixer with a fixed geometry versus a mixer with a combined fixed and variable geometry.

FIG. 6 shows a graph of back pressure (kPa) versus volumetric flow rate ($m^3/s$). A first line 110 shows the back pressure increase for a traditional mixer having a fixed geometry. A second line 112 shows the back pressure increase for a mixer incorporating the subject invention that includes a valve 82 to provide a variable geometry. The second line 112 includes a first portion 114 that shows the subject mixer 30 operating under the fixed geometry configuration. When the valve 82 starts to open when the exhaust gas flow rate exceeds the predetermined limit, as indicated at 116, the open area on the upstream baffle 50 varies. This variance is shown as a second portion 118 of the second line 112 which represents the variable geometry. At higher volumetric flow rates, by providing the variable geometry, the subject invention reduces back pressure by 20% (indicated at 120) as compared to the traditional mixer (see line 110).

As shown, back pressure within the mixer increases as the volumetric exhaust flow through the mixer increases. Simulation and physical testing have shown that higher restriction provides the benefit of reduced deposit formation. However, for fuel economy reasons, the trend is to have low restriction mixers for the rated power of the engine considered for a given application. But, when back pressure is low, potential for deposit formation is significantly increased. The subject invention provides a variable configuration mixer that can vary back pressure under certain conditions to provide desired operating performance and a minimal amount of deposit formation.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer assembly for a vehicle exhaust system comprising:
    a mixer housing defining an internal cavity configured to receive engine exhaust gases;
    an upstream baffle positioned at an inlet end of the mixer housing, the upstream baffle comprising a plate having an open area that comprises a fixed geometric configuration through which exhaust gas enters the internal cavity; and
    a valve that is movable from a closed position toward an open position to provide a variable geometric configuration that changes the open area to reduce back pressure.

2. The mixer assembly according to claim 1 wherein the valve moves toward the open position in response to exhaust gas flow rate exceeding a predetermined limit.

3. The mixer assembly according to claim 2 wherein the open area for the fixed geometric configuration comprises at least one primary opening through which exhaust gas enters the internal cavity.

4. The mixer assembly according to claim 3 wherein the open area for the fixed geometric configuration further comprises one or more secondary openings that are smaller than the primary opening.

5. The mixer assembly according to claim 3 wherein the upstream baffle includes an aperture that receives the valve, and wherein when the valve is in the closed position the mixer assembly is operating in the fixed geometric configuration, and wherein when the valve moves toward the open position the mixer assembly is operating in the variable geometric configuration.

6. The mixer assembly according to claim 5 wherein, as the valve moves toward the open position, the open area is increased via exposure of the aperture to reduce back pressure.

7. The mixer assembly according to claim 5 wherein the valve comprises a flap that is mounted to the upstream baffle in an overlapping relationship with the aperture, and including a resilient member to bias the flap to the closed position.

8. The mixer assembly according to claim 7 including a stop to limit opening movement of the flap and define a maximum open position.

9. The mixer assembly according to claim 8 including a seat to limit closing movement of the flap and define a fully closed position, and wherein the flap is positionable between the fully closed position and the maximum open position in an infinite number of positions in response to changes in exhaust gas flow rates to provide the variable geometric configuration.

10. The mixer assembly according to claim 1 wherein the mixer housing includes an injection opening, and including a doser configured to inject fluid through the injection opening and into the internal cavity to mix with the engine exhaust gases.

11. The mixer assembly according to claim 1 wherein the valve is a passive valve that is solely moveable to the open position in response to an exhaust gas flow rate exceeding a predetermined limit, and including a resilient member to bias the valve toward the closed position.

12. A vehicle exhaust system comprising:
a first exhaust component configured to receive engine exhaust gases;
a second exhaust component downstream of the first exhaust component;
a mixer positioned between the first and second exhaust components, the mixer including
an outer housing that defines an internal cavity to receive the engine exhaust gases from the first component, the outer housing including at least one injection opening,
an upstream baffle positioned at an inlet end of the mixer housing, the upstream baffle comprising a plate having an open area that comprises a fixed geometric configuration through which exhaust gas enters the internal cavity, and
a valve that is movable from a closed position toward an open position to provide a variable geometric configuration that changes the open area to reduce back pressure, and wherein the valve moves toward the open position in response to an exhaust gas flow rate exceeding a predetermined limit; and
a doser configured to introduce fluid through the injection opening and into the internal cavity to mix with the engine exhaust gases to provide a mixture that is directed to the second exhaust component.

13. The vehicle exhaust system according to claim 12 wherein the open area for the fixed geometric configuration comprises at least one primary opening through which exhaust gas enters the internal cavity.

14. The vehicle exhaust system according to claim 12 wherein the upstream baffle includes an aperture that receives the valve, and wherein when the valve is in the closed position the mixer assembly is operating in the fixed geometric configuration, and wherein when the valve moves toward the open position the mixer assembly is operating in the variable geometric configuration.

15. The vehicle exhaust system according to claim 14 wherein the valve comprises a flap that is mounted to the upstream baffle in an overlapping relationship with the aperture, and including a resilient member to bias the flap to the closed position.

16. The vehicle exhaust system according to claim 15 wherein the valve includes a frame that fits into the aperture, and wherein the flap is mounted for pivotal movement relative to the frame, and wherein the flap is pivotable between a fully closed position and a maximum open position in an infinite number of positions in response to changes in exhaust gas flow rates to provide the variable geometric configuration.

17. A method for reducing back pressure in a mixer for an exhaust system comprising the steps of:
providing a mixer housing defining an internal cavity that receives engine exhaust gases;
positioning an upstream baffle at an inlet end of the mixer housing, the upstream baffle comprising a plate having an open area that comprises a fixed geometric configuration through which exhaust gas enters the internal cavity; and
moving a valve from a closed position toward an open position when an exhaust gas flow rate exceeds a predetermined limit to provide a variable geometric configuration that changes the open area to reduce back pressure.

18. The method according to claim 17 including providing the open area for the fixed geometric configuration to include at least one primary opening through which exhaust gas enters the internal cavity and one or more secondary openings that are smaller than the primary opening.

19. The method according to claim 18 including forming an aperture in the upstream baffle, installing the valve in the aperture, biasing the valve to the closed position to allow the mixer to operate in the fixed geometric configuration, and moving the valve toward the open position when the exhaust gas flow rate exceeds the predetermined limit to allow the mixer to operate in the variable geometric configuration.

20. The method according to claim 17 including forming an opening in the mixer housing and aligning a doser with the opening to allow the doser to introduce fluid through the housing and into the internal cavity to mix with the engine exhaust gases.

* * * * *